United States Patent
Nara et al.

[11] Patent Number: 6,066,283
[45] Date of Patent: May 23, 2000

[54] TIRE CURING APPARATUS

[75] Inventors: Hitoshi Nara, Kawagoe; Noboru Iwata, Kodaira, both of Japan

[73] Assignee: Bridgestone Corporation, Tokyo, Japan

[21] Appl. No.: 09/168,082

[22] Filed: Oct. 8, 1998

[30] Foreign Application Priority Data

Oct. 9, 1997 [JP] Japan .................................... 9-293623

[51] Int. Cl.⁷ ................................................. B29C 35/02
[52] U.S. Cl. ................................ 264/326; 425/46; 425/47
[58] Field of Search .......................... 264/326; 425/28.1, 425/46, 47

[56] References Cited

U.S. PATENT DOCUMENTS

| | | | |
|---|---|---|---|
| 3,730,658 | 5/1973 | Marra | 425/46 |
| 3,779,677 | 12/1973 | Greenwood | 425/46 |
| 3,833,323 | 9/1974 | Pasch . | |
| 3,850,555 | 11/1974 | Pasch | 425/46 |
| 3,852,006 | 12/1974 | Irie | 425/46 |
| 3,854,853 | 12/1974 | Mirtain | 425/46 |
| 3,989,791 | 11/1976 | Tippin | 425/46 |
| 3,990,823 | 11/1976 | Le Moullac | 425/46 |
| 4,289,463 | 9/1981 | Le Moullac | 425/46 |
| 5,141,424 | 8/1992 | Christof | 425/46 |
| 5,190,767 | 3/1993 | Beres et al. | 425/46 |

FOREIGN PATENT DOCUMENTS

| | | |
|---|---|---|
| 0 452 730 A1 | 10/1991 | European Pat. Off. . |
| 2 342 153 | 9/1977 | France . |
| 46-27051 | 8/1971 | Japan . |

*Primary Examiner*—James P. Mackey
*Attorney, Agent, or Firm*—Sughrue, Mion, Zinn, Macpeak & Seas, PLLC

[57] ABSTRACT

A tire curing apparatus comprises a lower mold, an upper mold, a sector mold comprised of plural arc-shaped segments, and a taper ring, and further provided with a single link, a rising means for giving a rising force to the arc-shaped segment, and a stopper for stopping the rocking of the single link.

5 Claims, 2 Drawing Sheets

TIRE CURING APPARATUS

BACKGROUND OF THE INVENTION

1. Field of the Invention

This invention relates to a curing apparatus for curing an uncured tire by using upper and lower and sector molds as well as a method for the manufacture of tires using the same.

2. Description of Related Art

As the conventional tire curing apparatus, there is known an apparatus described, for example, in JP-B-46-2705 1. This apparatus comprises a lower mold mainly forming a sidewall portion of a tire, an upper mold mainly forming another sidewall portion of the tire and capable of approaching to or separating away from the lower mold, a sector mold mainly forming a tread portion of the tire and comprised of plural arch-shaped segments arranged in a peripheral direction so as to show a ring form as a whole, and a tapering portion integrally united with the upper mold so as to approach to or separate away from the sector mold. When the tapering portion approaches to the sector mold, the arc-shaped segments are moved by a taper face formed in an inner periphery of the tapering portion toward the inside in a radial direction in synchronousness therewith to close them to each other. In this apparatus, a pin is fixed to a top end portion of an arm fastened to an outer end portion of each of the arc-shaped segments in the radial direction, while the pin is supported pivotably and movably in the radial direction to the lower mold and also a spring is disposed on the lower mold energizing the pin outward in the radial direction.

If it is intended to cure an uncured tire by using the above tire curing apparatus, after the uncured tire is placed on the lower mold, the upper mold and the tapering portion are approached to the sector mold and then arc-shaped shaped segments are moved by the taper face of the tapering portion in synchronousness therewith toward the inside in the radial direction against the spring. When these arc-shaped segments are moved to an inner limit in the radial direction, they are closed to each other to form a continuous ring shape. In this case, the upper and lower molds and the sector mold are closed to each other and the uncured tire is housed in the inside thereof. Thereafter, the inside of the molds is rendered into given high temperature and high pressure, whereby the uncured tire is cured. Next, when the upper mold and the tapering portion are separated away from the lower mold and the cured tire is raised, each of the arc-shaped segments and the arm are rocked upward around the pin by rocking means so as to be enlarged. At the same time, the arc-shaped segments are released from restraint with the tapering portion, so that they are moved to an outer limit in the radial direction by the energizing force of the spring. Then, the cured tire taken out from the mold is transported to subsequent step.

In the conventional tire curing apparatus, however, the arc-shaped segments are separated from the tread portion of the cured tire by rocking the arc-shaped segment and arm upward around he pin as mentioned above, so that a normal line to the cured tire and a normal line to the arc-shaped segment intersect at an obtuse angle in the separating point and hence the land portions of the cured tire are taken out from a dent portion of the arc-shaped segment while bending at the obtuse angle. As a result, there are caused some problems that it is difficult to conduct the operation of taking out the cured tire from the tire curing apparatus and the cut or flaw is created in the land portion. And also, the curing apparatus requires the use of the rocking means for rocking the arc-shaped segment and hence it becomes complicated in the structure and high in the cost.

SUMMARY OF THE INVENTION

It is, therefore, an object of the invention to provide a tire curing apparatus being simple in the structure and cheap in the cost and capable of preventing the occurrence of cut or flaw in the taking-out of the tire as well as a method for the manufacture of the tire using the same.

According to a first aspect of the invention, there is the provision of a tire curing apparatus comprising a lower mold mainly forming a sidewall portion of the tire, an upper mold mainly forming another sidewall portion of the tire and capable of approaching to or separating away from the lower mold, a sector mold mainly forming a tread portion of the tire and comprised of plural arch-shaped segments arranged between the upper and lower molds in a peripheral direction so as to show a ring form as a whole, and a taper ring capable of approaching to or separating away from the sector mold and moving the arc-shaped segments inward in a radial direction so as to close them to each other by a taper face formed in an inner periphery of the taper ring in synchronousness therewith when approaching to the sector mold, and forming a curing space for housing an uncured tire therein when the upper mold, the lower mold and the sector mold are closed to each other, in which said apparatus is provided with a single link pivotably connecting an upper end portion to an outer portion of each of the arc-shaped segments in the radial direction and a lower end portion to the lower mold and slanting upward and inward in the radial direction in the closing of the molds, a rising means for giving a rising force to the arc-shaped segment interposed between each of the arc-shaped segments and the lower mold and tilting the arc-shaped segment upward toward the inside in the radial direction, and a stopper for stopping the rocking of the single link when the single link rocks outward over a vertical position around the connecting point to the lower mold.

According to a second aspect of the invention, there is the provision of a method of manufacturing a pneumatic tire by curing an uncured tire with a tire curing apparatus defined in the first aspect of the invention, in which the uncured tire is placed at such a state that each of arc-shaped segments is moved to an outer limit in the radial direction by rocking the arc-shaped segments outward over a vertical position around a connecting point of a single link to a lower mold, and the arc-shaped segments are forcedly moved inward and downward in the radial direction together to close upper and lower molds and sector mold to each other and an inner space of the closed molds is rendered into given high temperature and high pressure to cure the uncured tire, and each of the arc-shaped segments is rocked outward around the connecting point of the single link to the lower mold by raising the upper mold and a cured tire to lift each of the arc-shaped segments and then moved to the outer limit in the radial direction to take out the cured tire from the apparatus.

BRIEF DESCRIPTION OF THE DRAWINGS

The invention will be described with reference to the accompanying drawings, wherein.

DESCRIPTION OF PREFERRED EMBODIMENTS

Figure 1:
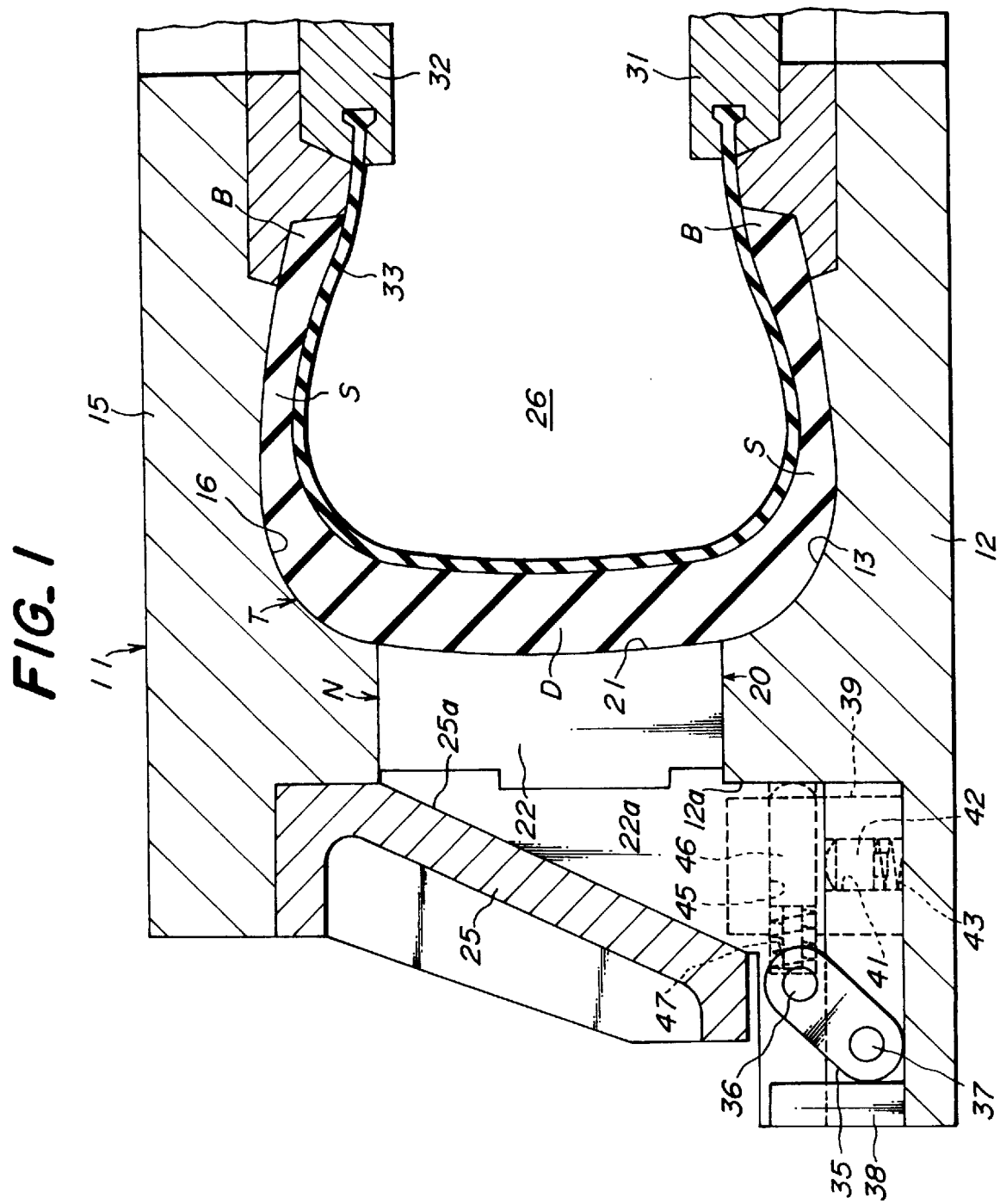
FIG. 1 is a partly longitudinal section view of an embodiment of the tire curing apparatus according to the invention.

When the uncured tire is cured by using the above tire curing apparatus, it is first placed on the lower mold. In this case, the single link is stopped by rocking outward over a vertical position around a connecting point to the lower mold so as to contact with a stopper. Since each of the arc-shaped segments is moved to the outer limit in the radial direction by such an outward rocking of the single link, a wide space is formed in the inside of the arc-shaped segments. And also, each of the arc-shaped segments is tilted upward toward the inside in the radial direction by the rising force supplied from the rising means, so that the placing of the uncured tire onto the lower mold becomes easy. Then, the taper ring is approached to the sector mold and the arc-shaped segments are forcedly moved inward and downward in the radial direction by the taper face of the taper ring in synchronousness therewith. As a result, the single link is rocked inward from a position over the vertical position by the movement of the arc-shaped segment and tilted upward toward the inside in the radial direction. At this time, the upper mold is approached to the lower mold. As the arc-shaped segments are moved to an inner limit in the radial direction to close to the lower mold, these arc-shaped segments are closed to each other to form a continuous ring and at the same time the lower mold, upper mold and sector mold are closed to each other to house the uncured tire in a space formed in the closed molds. Thereafter, the inside of these closed molds is rendered into given high temperature and high pressure to cure the uncured tire, during which the lower and upper molds mainly form the sidewall portions of the tire and the sector mold mainly forms the tread portion of the tire. Next, the taper ring is separated from the sector mold to release the restraint of the arc-shaped segments with the taper ring and raise the upper mold and a cured tire upward. At this time, each of the arc-shaped segments is lifted by the cured tire contacted therewith, whereby the single link tilted upward and inward in the radial direction is rocked outward around the connecting point to the lower mold to gradually stand up. As a result, each of the arc-shaped segments is moved outward in the radial direction while rising along an arc around the connecting point, whereby each of these arc-shaped segments is substantially simultaneously peeled off from the cured tire over a full face at an initial stage moving outward in the radial direction. Next, the land portions of the cured tire get out from dent portions of the arc-shaped segments accompanied with the outward movement of the arc-shaped segments in the radial direction. In this case, since each of the arc-shaped segments is pivotably connected to the single link as previously mentioned, the arc-shaped segments maintain a most reasonable posture irrespectively of the rocking of the single link till the land portions of the cured tire are get out from the arc-shaped segments or maintain such a posture that a normal line to the cured tire and a normal line to the arc-shaped segment extend in substantially the same direction at each peeling point, and hence the land portions of the cured tire easily get out from the arc-shaped segments without being substantially subjected to deformation through the dent portion even if the dent portion of the arc-shaped segment is deeper. As a result, when the cured tire is taken out from the tire curing apparatus, defects such as cut, flaw and the like there are not created in the land portion. Each of the arc-shaped segments moves outward in the radial direction through inertia even after the separation from the cured tire, but such a movement is stopped at the outer limit when the single link contacts with the stopper. In this case, the single link stops at a position over the vertical position, so that it is never rocked inward unless external force is applied. On the other hand, the rising means pushes upward an inner end portion of each of the arc-shaped segments in the radial direction so that the arc-shaped segment is tilted upward toward the inside in the radial direction. Thus, the arc-shaped segments are moved outward in the radial direction by the rise of the cured tire to release the molds, so that a special rocking means for releasing the molds is not required and hence the structure of the apparatus as a whole is simple and the production coat becomes cheap.

In a preferable embodiment of the invention, the apparatus is provided with a rocking means for giving a rocking force outward to the single link, whereby the arc-shaped segments after the separation of the cured tire can surely be moved to the outer limit in the radial direction.

In another preferable embodiment of the invention, a spring is used as a rising means or a rocking means, whereby the arc-shaped segments after the separation of the cured tire can be moved in a desired direction with a simple structure.

In FIG. 1, numeral 11 is a tire curing apparatus. This curing apparatus 11 comprises a lower mold 12 fixed to a lower base (not shown), an upper face of which mold 12 mainly forms a sidewall portion (lower sidewall portion) S of an uncured tire T. In the illustrated embodiment, a forming face 13 forming the sidewall portion together with a lower bead portion B is provided on the upper face of the lower mold. An upper mold 15 fixed to an upper base (not shown) is disposed above the lower mold 12 and lifted upward and downward by a lifting means (not shown) together with the upper base so as to approach to or separate from the lower mold 12. A lower face of the upper mold 15 mainly forms another sidewall portion (upper sidewall portion) S of the uncured tire T. In the illustrated embodiment, a forming face 16 forming the sidewall portion together with an upper bead portion B is provided on the lower face of the upper mold. A sector mold 20 showing a ring form as a whole is disposed between the lower mold 12 and the upper mold 15, in which a forming face 21, mainly forming a tread portion D of the uncured tire T is provided on an inner periphery of the sector mold 20. The sector mold 20 is comprised of plural arc-shaped segments 22 (nine segments in the illustrated embodiment) arranged in a peripheral direction thereof. An outer periphery of each of the arc-shaped segments 22 is provided with a taper face 22a tilting upward and inward in the radial direction.

Numeral 25 is a taper ring disposed at the outside of the sector mold 20 in the radial direction when being located in a descent end and an upper end thereof is fixed to the upper mold 15. As a result, the taper ring 25 approaches to or separates from the sector mold 20 with the movement of the upper mold 15. On an inner periphery of the taper ring 25 is formed a taper face 25a having the same gradient as in the taper face 22a of the arc-shaped segment 22. Therefore, when the taper ring 35 descends together with the upper mold 15 so as to contact with the sector mold 20, each of the arc-shaped segments 22 is moved inward in the radial direction by a wedge action of the taper faces 22a, 25a in synchronousness therewith. When the arc-shaped segments are moved to an inner limit N in the radial direction, these segments 22 are closed to each other to from a continuous ring and at the same time the sector mold 20 is closed to the descended upper mold 15 and the lower mold 12, whereby a doughnut-shaped curing space 26 for housing the uncured tire T is formed inside the closed molds 12, 15, 20, while the forming faces 13, 16, 21 are continuous and match with an outer profile of a cured tire.

Numeral 31 is a lower clamp ring contacting with an upper face of the lower mold 12 at an inner end portion in the radial direction, and numeral 32 is an upper clamp ring being liftable and capable of contacting with a lower face of the upper mold 15 at an inner end portion in the radial direction. A flexible curing bladder 33 is airtightly attached at both ends to these lower and upper clamp rings 31, 32. When the inside of the bladder 33 is filled with a curing medium of high temperature and high pressure, it expands to a doughnut form in the uncured tire T and pushes the uncured tire T to the lower, upper and sector molds 12, 15 20 to conduct the curing.

Figure 2:
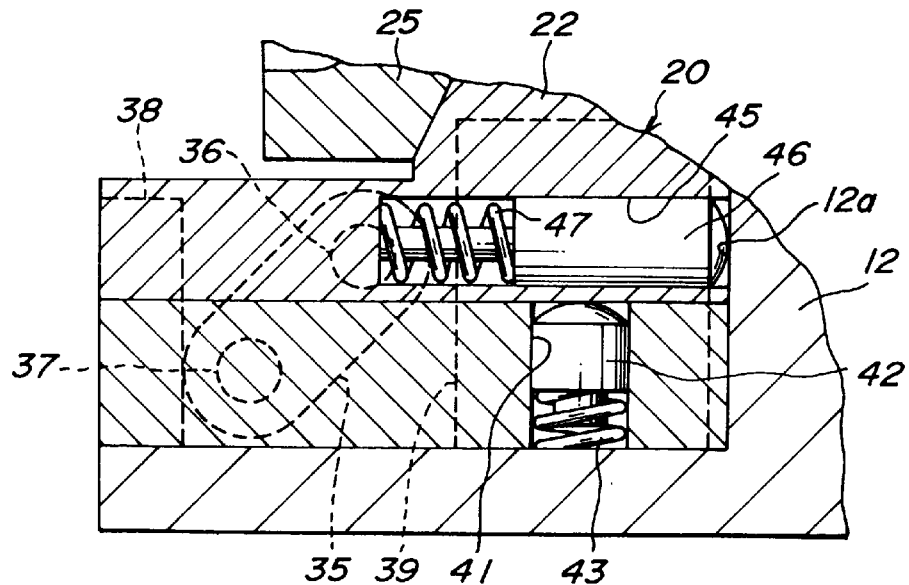
FIG. 2 is a partly longitudinal section view in the vicinity of a spring.

In FIGS. 1 and 2, numeral 35 is a pair of single links each pivotably connecting at an upper end portion to an outer portion of each of the arc-shaped segments 22 through a pin 36 and at a lower end portion to an outer end portion of the lower mold 12 in the radial direction through a pin 37. Thus, these single links 35 can be rocked in a plane parallel to a vertical face including a central axis of the sector mold 20. These single links 35 are arranged to both ends of each of the arc-shaped segments 22 in the peripheral direction, and tilt upward and inward in the radial direction when the arc-shaped segments 22 are moved to the inner limit N in the radial direction to close the lower, upper and sector molds 12, 15, 20. And also, when the arc-shaped segments 22 moved outward in the radial direction, these single links 35 rock outward around a connecting point to the lower mold 12 or around the pin 37.

Figure 3:
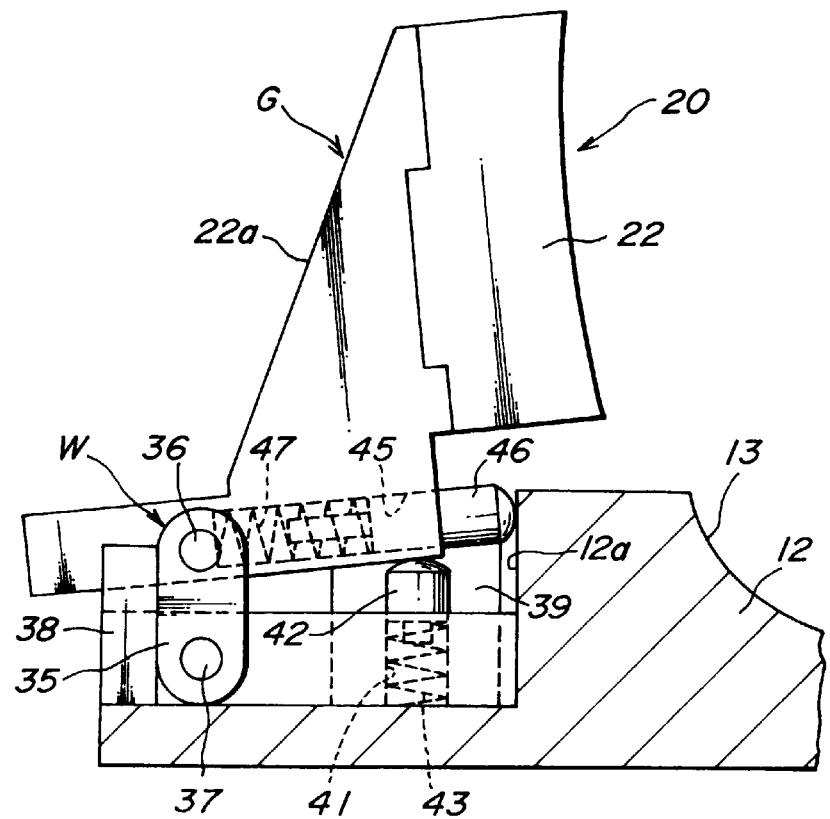
FIG. 3 is a partly longitudinal section view in the vicinity of a single link illustrating an operation thereof.

Numeral 38 is a stopper fixed to the outer end portion of the lower mold 12 in the radial direction. The number of the stoppers is the same as the number of the single links 35 used. When the single link 35 is rocked to an outward position W somewhat exceeding over a vertical position, it contacts with the stopper 38. That is, when the single link 35 contacts with the stopper 38, the outward rocking of the single link 35 is stopped and the arc-shaped segment 22 locates at an outer limit G in the radial direction as shown in FIG. 3. When the single link 35 rocks up to the outer position W as mentioned above, the single link 35 tilts in a direction opposite to the above case, or upward and outward in the radial direction, so that the inward rocking is never caused unless the single link 35 is subjected to an external force directing inward in the radial direction.

Numeral 39 is a pair of guide plates fixed to the outer end portion of the lower mold 12 in the radial direction. In this case, plural pairs of the guide plates, particularly the guide plates having the same pairs as the number of the arc-shaped segments are used. Such a pair of the guide plates 39 slidably engage with both side faces of the arc-shaped segment and guide the movement of the arc-shaped segment in the radial direction and up-and-down directions.

A plurality of housing holes 41 extending in up-and-down directions, preferably the housing holes being the same as the number of the arc-shaped segments 22 are formed in the lower mold 12 at a position inward from the pin 37 in the radial direction and at equal intervals in the peripheral direction. A transmission member 42 contacting at an upper end with the lower face of the arc-shaped segment 22 is slidably inserted into each of the housing holes 41. Numeral 43 is a compression coil spring interposed between the arc-shaped segment 22 and the lower mold 12, particularly between a bottom face of the housing hole 41 and the transmission member 42 as means for giving a raising force. The spring 43 gives the rising force to each of the arc-shaped segments 22 through the transmission member 42. The arc-shaped segments 22 are rocked by such a rising fore so as to raise the inner end portion in the radial direction upward around the pin 36 and tilt upward toward the inside in the radial direction. Numeral 45 is a housing hole formed in the lower end portion of the arc-shaped segment 22 and extending in the radial direction. Into the housing hole 45 is slidably inserted a transmission member 46 contacting at a top (an inner end in the radial direction) with a step face 12a of the lower mold 12. Numeral 47 is a compression coil spring interposed between the arc-shaped segment 22 and the lower mold 12, particularly between the bottom face of the housing hole 45 and the transmission member 46 as a rocking means. The spring 47 gives a rocking force directing outward to the single link 35 through the arc-shaped segment 22, but such a rocking force is merely assistant as mentioned below. When springs 43, 47 are used as the rising means and the rocking means, the arc-shaped segments 22 can be moved in a desired direction with a simple structure.

The function of the apparatus according to the invention will be described below.

If it is intended to cure an uncured tire T by using the above tire curing apparatus 11, the uncured tire T is first transferred into the tire curing apparatus 11 and horizontally placed on the lower mold 12 to contact with the forming face 13 for the lower sidewall portion S and bead portion B. In this case, the single link 35 is subjected to a rocking force from the spring 47 to rock outward around the pin 37 as shown in FIG. 3, but the rocking of the single link 35 is stopped at the outward position W exceeding the vertical position by contacting the single link 35 with the stopper 38 to control excessive outward movement in the radial direction. When the single link 35 rocks outward to contact with the stopper 38 as mentioned above, each of the arc-shaped segments 22 moves to the outer limit G in the radial direction, so that a wide space is formed inside these arc-shaped segments 22. And also, each of these arc-shaped segments 22 is largely tilted upward from the inside in the radial direction by the rising force given from the spring 43, so that the sector mold 20 comprised of these arc-shaped segments 22 is largely enlarged upward. Therefore, the placement of the uncured tire T on the lower mold 12 becomes easy. At this time, the transmission member 46 is energized by the spring 47 to protrude its top portion inner end portion in the radial direction) from the housing hole 45, and the transmission member 42 is energized by the spring 43 to protrude its upper end portion from the housing hole 41.

Then, when the taper ring 25 is approached to the sector mold 20 by descending the upper mold 15, the arc-shaped segments 22 are pushed by the taper face 25a of the taper ring 25 to rock downward around the pint 36 so that the lower faces thereof are parallel to the upper face of the lower mold 12. Thereafter, each of the arc-shaped segments 22 is moved inward in the radial direction by the synchronized wedge action of the taper faces 22a, 25a to approach to the uncured tire T, during which the transmission member 46 is pushed into the housing hole 45 to compress the spring 47. By such an inward movement of the arc-shaped segment 22 in the radial direction is rocked the single link 35 inward over the vertical position around the pin 37 to tilt upward and inward in the radial direction. Thus, each of the arc-shaped segments 22 is moved downward and parallel along an arc around the pin 37 by the inward movement of the arc-shaped segment 22 in the radial direction and the inward rocking of the single link 35, during which the transmission member 42 is pushed into the housing hole 41 to compress the spring 43. And also, the rising force is always applied to each of the arc-shaped segments 22 from the spring 43 in the parallel movement of the arc-shaped segment 22, so that there is prevented an accident of dropping downward the arc-shaped segment 22 by its own weight at once to collide with the lower mold 12. At this time, the upper mold 15 approaches to the lower mold 12 through the above descending.

When the arc-shaped segments 22 are moved to the inner limit N in the radial direction to close to the lower mold 12, these arc-shaped segments 22 are closed to each other to form a continuous ring and at the same time, the upper, lower and sector molds 12, 15, 20 are closed to each other to house the uncured tire T in a space formed in the closed molds 12, 15, 20. Thereafter, a curing medium of high temperature and high pressure is charged into the curing bladder 33 to render the space in the closed molds 12, 15, 20 into given high temperature and high pressure to cure the uncured tire T. In this case, the curing bladder 33 expands in form of doughnut in the uncured tire T, so that the uncured tire T is pushed onto the forming faces 13, 16, 21, whereby the sidewall portions S of the uncured tire T are mainly formed through the lower and upper molds 12,15 and the tread portion D is mainly formed through the sector mold 20.

After the completion of the curing operation, the curing medium is discharged from the curing bladder 33 to contract the curing bladder 33. Then, the upper mold 15 is raised to separate the taper ring 25 from the sector mold 20, whereby the each of the arc-shaped segments 22 is released from the restraint with the taper ring 25 and also the cured tire is raised by a take-up means (not shown). In this case, each of the arc-shaped segments 22 is pulled upward by the cured tire contacted therewith, during which the single link 35 tilted upward and inward in the radial direction is rocked outward by the raising of the arc-shaped segment 22 to gradually stand up. Thus, each of the arc-shaped segments 22 is moved outward in the radial direction while raising along the arc around the pi 37 and substantially peeled off from the cured tire over a full region at an initial stage of the movement. Thereafter, the land portions of the cured tire get out from the dent portions of the arc-shaped segments 22 with the outward movement of the arc-shaped segment 22 in the radial direction. In this case, since the arc-shaped segment 22 is pivotably connected to the single link 35 through the pin 36, the arc-shaped segment 22 rocks to the single link 35 without tilting to the cured tire. Thus, the arc-shaped segments 22 maintain a most reasonable posture till the land portions of the cured tire completely get out irrespectively of the rocking of the single link 35, or maintain such a posture that normal line to the cured tire and normal line to the arc-shaped segment 22 extend in substantially the same direction at each peeling point, and hence the cured tire easily gets out from the dent portion of the arc-shaped segment 22 without being subjected to deformation through the dent portion even if the dent portion is deeper. Therefore, when the cured tire is taken out from the tire curing apparatus 11, there is caused no defect such as cut, flaw and the like in the land portion.

Even after the cured tire is taken out, each of the arc-shaped segments 22 and the single links 35 move and rock outward in the radial direction through inertia. In this case, elastic force in the same direction as mentioned above is auxiliarily given to the arc-shaped segment 22 and the single link 35 from the spring 47, whereby the outward movement and rocking of the arc-shaped segment 22 and single link 35 in the radial direction are ensured. Then, the single link 35 is stopped to the outer position W by contacting with the stopper 38, while each of the arc-shaped segments 22 is moved to the outer limit G in the radial direction and stopped at this position. Sine the outer position W stopping the single link 35 is a position somewhat exceeding the vertical position outward, the single link 35 holds this position without rocking inward unless the external force is applied thereto. In this way, the arc-shaped segments 22 are moved outward in the radial direction by the raising of the cured tire to release the molds, particularly the sector mold 20, so that a special rocking means for releasing the sector mold 20 is useless and hence the structure of the apparatus as a whole becomes simple and the production cost can be made cheap. After the separation of the cured tire, each of the arc-shaped segments 22 is pushed upward by the spring 43, so that the arc-shaped segment 22 rocks to the single link 35 around the pin 36 so as to tilt upward and inward in the radial direction.

In case of exchanging a mold, as the upper mold 15 and the taper ring 25 are raised, the arc-shaped segment 22 and the single link 35 are automatically moved and rocked to outer limit G and outer position W in the radial direction by the rising force and rocking force of the springs 43, 47 to release the sector mold 20.

In the above embodiment, the taper ring 35 is attached to the upper mold 15 and moved therewith. In the invention, however, the taper ring and the upper mold may separately and individually be moved. And also, the rocking of the single link 35 is stopped by directly contacting the single link 35 with the stopper 38 in the above embodiment. In the invention, however, the rocking of the single link may be stopped through the arc-shaped segment by contacting the arc-shaped segment with the stopper. And also, the rocking force of the spring 47 is transmitted to the single link 35 through the arc-shaped segment 22 by disposing the compression coil spring 47 in the arc-shaped segment 22 in the above embodiment. In the invention, however, the rocking force may directly be applied to the single link by disposing a torsional coil spring in the pin. Furthermore, the springs 43, 47 are used as the rising means and the rocking means in the above embodiment, but a small-size air cylinder or the like may be used in the invention.

As mentioned above, according to the invention, the occurrence of defects in the taking out of the cured tire can be prevented by using the apparatus of simple and cheap structure.

What is claimed is:

1. A tire curing apparatus comprising a lower mold mainly forming a sidewall portion of the tire, an upper mold mainly forming another sidewall portion of the tire and capable of approaching to or separating away from the lower mold, a sector mold mainly forming a tread portion of the tire and comprised of plural arc-shaped segments arranged between the upper and lower molds in a peripheral direction so as to show a ring form as a whole, and a taper ring capable of approaching to or separating away from the sector mold and moving the arc-shaped segments inward in a radial direction so as to close them to each other by a taper face formed in an inner periphery of the taper ring in synchronousness therewith when approaching to the sector mold, and forming a curing space for housing an uncured tire therein when the upper mold, the lower mold and the sector mold are closed to each other, in which said apparatus is provided with a single link pivotably connecting an upper end portion to an outer portion of each of the arc-shaped segments in the radial direction and a lower end portion to the lower mold and slanting upward and inward in the radial direction in the closing of the molds, a rising means for giving a rising force to the arc-shaped segment interposed between each of the arc-shaped segments and the lower mold and tilting the arc-shaped segment upward toward the inside in the radial direction, and a stopper for stopping the rocking of the single link when the single link rocks outward over a vertical position around the connecting point to the lower mold.

2. A tire curing apparatus according to claim 1, wherein said apparatus is provided with a rocking means for giving a rocking force outward to the single link.

3. A tire curing apparatus according to claim 1, wherein a spring is used as the rising means.

4. A tire curing apparatus according to claim 2, wherein a spring is used as the rocking means.

5. A method of manufacturing a pneumatic tire by curing an uncured tire with a tire curing apparatus as claimed in claim 1, in which the uncured tire is placed at such a state that each of arc-shaped segments is moved to an outer limit in the radial direction by rocking the arc-shaped segments outward over a vertical position around a connecting point of a single link to a lower mold, and the arc-shaped segments are forcedly moved inward and downward in the radial direction together to close upper and lower molds and sector mold to each other and an inner space of the closed molds is rendered into given high temperature and high pressure to cure the uncured tire, and each of the arc-shaped segments is rocked outward around the connecting point of the single link to the lower mold by raising the upper mold and a cured tire to lift each of the arc-shaped segments and then moved to the outer limit in the radial direction to take out the cured tire from the apparatus.

* * * * *